US007898593B2

(12) United States Patent
Sullivan et al.

(10) Patent No.: US 7,898,593 B2
(45) Date of Patent: Mar. 1, 2011

(54) SYSTEM AND METHOD FOR SYNCHRONIZING AN ILLUMINATOR TO A VIDEO CAMERA

(75) Inventors: Ryan E. Sullivan, Yardley, PA (US); Mike Kovach, Ontario (CA); Jens Wulf, Grafelfing (DE)

(73) Assignee: Photon Technology International, Inc., Birmingham, NJ (US)

(*) Notice: Subject to any disclaimer, the term of this patent is extended or adjusted under 35 U.S.C. 154(b) by 205 days.

(21) Appl. No.: 11/676,262

(22) Filed: Feb. 16, 2007

(65) Prior Publication Data
US 2007/0247528 A1 Oct. 25, 2007

Related U.S. Application Data

(60) Provisional application No. 60/773,921, filed on Feb. 16, 2006.

(51) Int. Cl.
*H04N 5/222* (2006.01)
*G01J 3/12* (2006.01)
*F21V 9/00* (2006.01)

(52) U.S. Cl. ............. 348/370; 348/371; 356/332; 362/293

(58) Field of Classification Search .......... 348/370, 348/371; 356/332; 362/293
See application file for complete search history.

(56) References Cited

U.S. PATENT DOCUMENTS

| 5,889,588 A | 3/1999 | Santman et al. | |
|---|---|---|---|
| 2004/0109208 A1* | 6/2004 | Amanai et al. | 359/13 |
| 2005/0231633 A1* | 10/2005 | Yuyama et al. | 348/370 |
| 2005/0270413 A1* | 12/2005 | Hatano et al. | 348/370 |
| 2006/0038916 A1* | 2/2006 | Knoedgen et al. | 348/371 |
| 2006/0061680 A1* | 3/2006 | Madhavan et al. | 348/370 |

* cited by examiner

*Primary Examiner*—David L Ometz
*Assistant Examiner*—Quang V Le
(74) *Attorney, Agent, or Firm*—Fox Rothschild LLP; Perry M. Fonseca, Esq.; Richard C. Woodbridge, Esq.

(57) ABSTRACT

The present invention provides synchronization and control between the wavelength of a multi-wavelength illuminator and the image frames acquired by a video camera. In accordance with the present invention, the trailing edge of a camera expose-signal triggers a pre-loaded digital value to be output from a FIFO buffer. The digital value selects a particular illumination wavelength either directly or through a voltage from a digital to analog converter. The FIFO may be periodically refilled, or it may be a circular register.

1 Claim, 2 Drawing Sheets

SYSTEM AND METHOD FOR SYNCHRONIZING AN ILLUMINATOR TO A VIDEO CAMERA

CROSS-REFERENCE TO RELATED APPLICATIONS

This application is based on and claims priority to U.S. Provisional Application No. 60/773,921, filed Feb. 16, 2006, the contents of which are fully incorporated herein by reference.

BACKGROUND OF THE INVENTION

1. Field of the Invention

This invention pertains to the real-time control of illumination, and, more particularly to the controlling and synchronizing the wavelength of the illumination delivered to a target being subjected to image acquisition by a video camera or other image storing device.

2. Description of Related Art

Synchronization of a stroboscopic light source to the operation of a video camera is well known. Typically, the light source provides a burst of illumination for each frame being recorded by the video camera. The operation of the light source is typically triggered by sensing the end of an expose signal from the camera and discharging the light source to coincide with the end of the exposure.

In scientific imaging application, unique information can frequently be obtained from monochromatic illumination of a target and recording one or more images of the illuminated target. For this reason, a number of monochromatic illuminators have been developed, such as those described in U.S. Pat. No. 5,889,588. However, the amount of unique information obtainable using monochromatic illumination of a target can be maximized if each video frame is acquired using a unique (different) wavelength of monochromatic illumination. Unfortunately, prior art systems that do not possess the capability of selecting different wavelengths of illumination for each successive frame being acquired by the imaging device. Accordingly, it would be desirable to have random wavelength access monochromatic illumination system synchronized with the exposure cycle of the imaging device.

SUMMARY OF THE INVENTION

Briefly described, the invention provides synchronization between the wavelength of a random wavelength access monochromatic illuminator and the image frames acquired by a video camera. In accordance with the present invention, the trailing edge of a camera expose-signal triggers a pre-loaded digital value to be output from a FIFO buffer. The digital value selects a particular illumination wavelength either directly or through a voltage from a digital to analog converter. The FIFO may be periodically refilled, or it may be a circular register.

DETAILED DESCRIPTION OF THE PREFERRED EMBODIMENT

Figure 1:
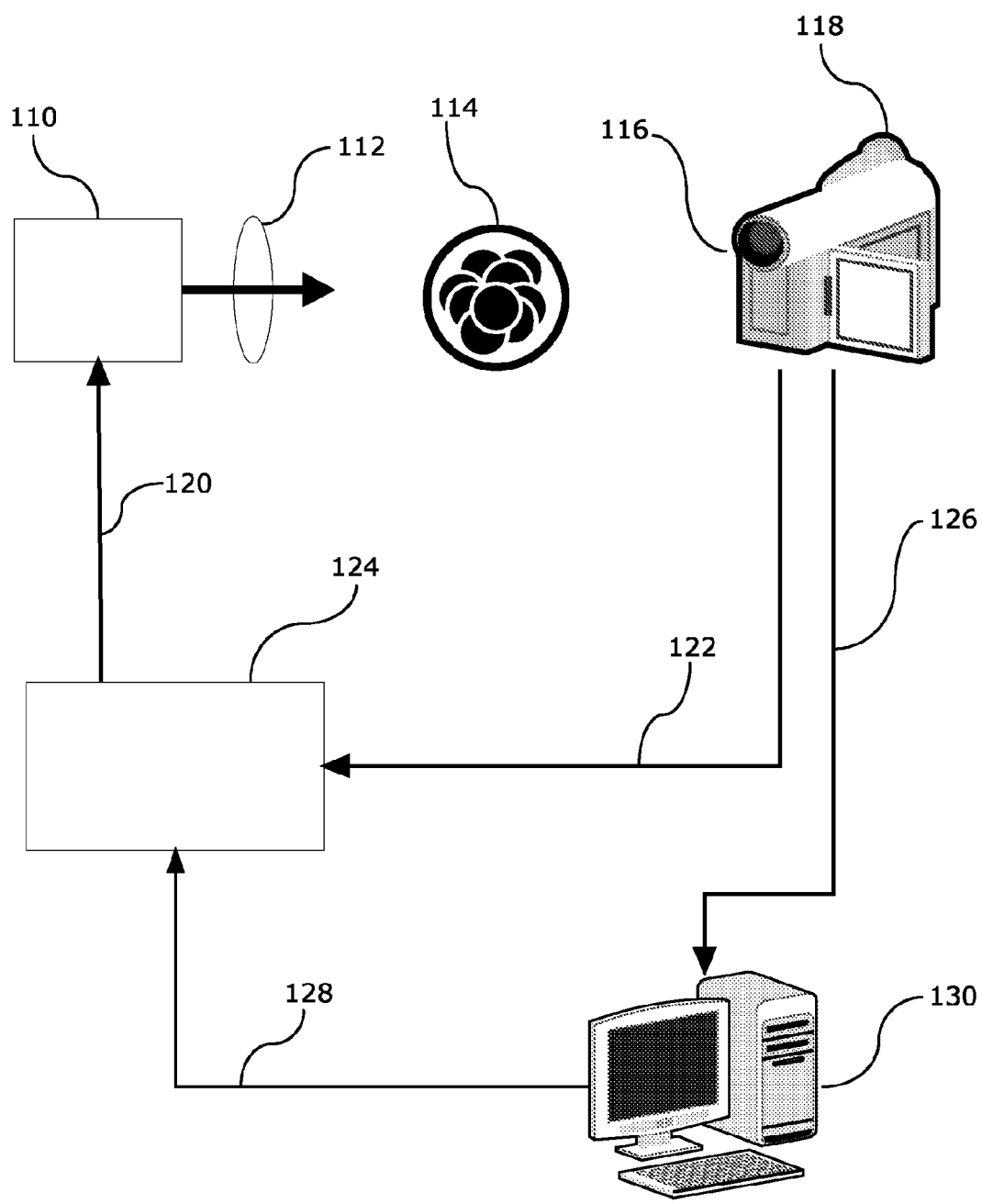
FIG. 1 is a block diagram of an image acquisition system with a video camera, a random wavelength access monochromatic illuminator, and the synchronization system.

FIG. 1 is block diagram of an image acquisition system according to an embodiment of the present invention. Referring to FIG. 1, an illumination source 110 having an adjustable monochromatic wavelength illuminates a target or sample 114 through optical system 112 (e.g., a lens). A second optical system 116 (e.g., a video camera lens) images the sample onto a video camera 118. Each of these elements are known elements. In a well-known manner, electronic images imaged by the video camera 118 are communicated via an interface 126 to a computer 130 having storage capability, where they are saved.

Video camera 118 outputs an "expose signal" 122 in a known manner, which indicates when the video camera 118 is acquiring an image. The duration of the expose signal 122 corresponds to one frame cycle of the camera, i.e., it marks the time from the beginning of image acquisition for one frame, to the beginning of image acquisition for the next frame. The expose signal 122 is essentially a clock signal (it oscillates between a high and a low state) and is input to a synchronizing system 124, details of which are described below in connection with FIG. 2. In a high state the expose signal 122 indicates that an image is being acquired and the illumination of the target or sample should take place during this portion of the signal. When the expose signal 122 is in a low state (during which no image is being acquired) illumination conditions may be changed without influencing an image. This period of the low state defines the boundary between one frame image and the next frame image. When the expose signal 122 again goes high, the image acquisition period for the next frame begins. Obviously the directions of the clock signal (low for expose, high for no expose) could be reversed and this would still be covered by the present invention.

The synchronizing system 124 sets the random wavelength access monochromatic illuminator 110 to a desired wavelength via a data interface 120. The internal electronics of the synchronizing system 124 use the transition of the expose signal from high to low as the trigger point for when to change the wavelength (if a wavelength change is desired) of the light from the illuminator 110, so as not to negatively affect the image acquisition. Computer 130 is also connected to the synchronizing system 124, allowing the specific desired illumination wavelengths to be programmed into the synchronizing system 124 from computer 130.

Figure 2:
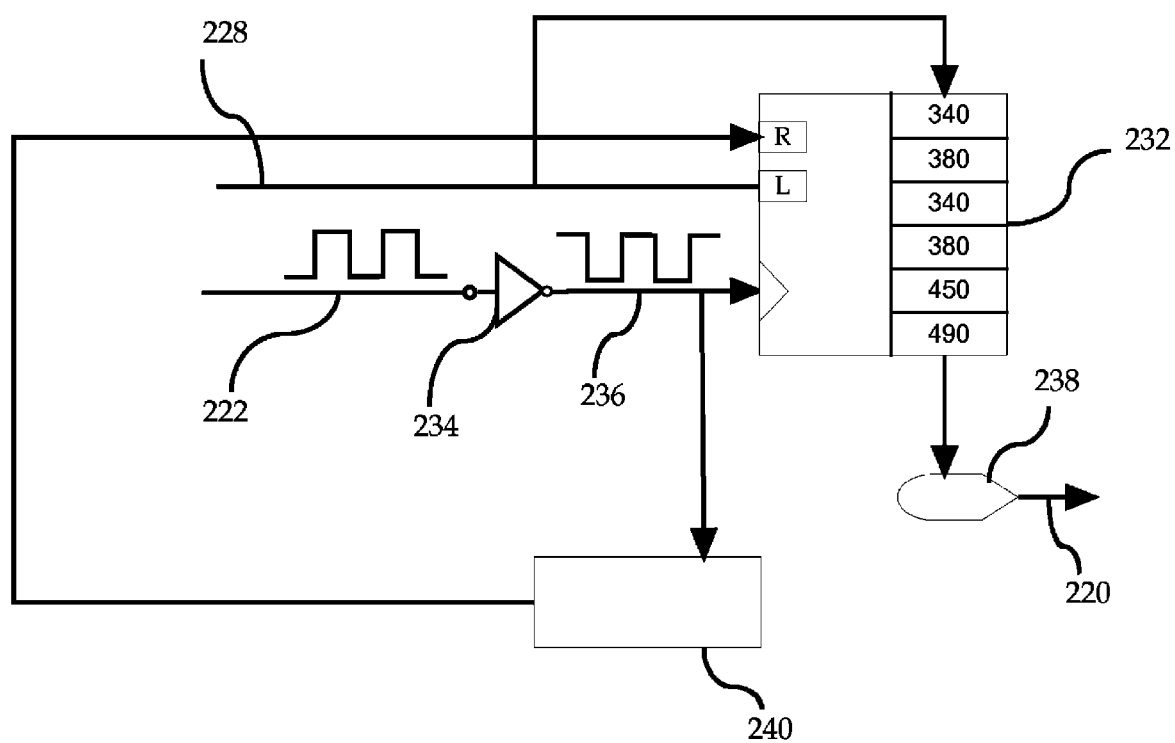
FIG. 2 is a block diagram of one implementation of a synchronization system in accordance with the present invention.

FIG. 2 is a block diagram of one implementation of a synchronization system 124 in accordance with the present invention and, more specifically, one implementation of logic that could be used to perform the synchronization function. A FIFO register 232 stores a plurality of digital values, each of which corresponds to a particular wavelength to be output by the illumination source 110. The digital values in the FIFO register 232 derive from the computer, via the interface 228, which carries both a data and a load signal. Fresh data can be input asynchronously. Each time the FIFO register 232 is clocked by clock signal 236, the next value in register 232 is presented output from FIFO register 232 to an output register 238. Output register 238 is coupled to the random wavelength access monochromatic illuminator 110 via data interface 220.

An inverter 234 inverts the pulses of the expose signal 222 so that the inverted expose signal goes into a high state when the non-inverted expose signal goes into the low state (the time when no exposure is occurring). As soon as inverted expose goes high, the FIFO is clocked, outputting the next digital value from the FIFO register 232, thereby setting the wavelength of the illuminator 110 to the wavelength corresponding to the digital value. In this manner the wavelength is changed while the camera is in the non-exposure portion of the expose-signal, i.e., when the camera in not imaging a frame.

While the FIFO may be constantly refilled with random values from the computer, it is also possible to simply repeat an output sequence from the FIFO register 232. A counter 240 can count the number of positive pulses occurring in the inverted expose signal and reset the FIFO register 232 after a predetermined count so that the output sequence repeats after the pre-determined count.

The synchronizing and illumination control system of the present invention allows the wavelength of the illumination being provided to be easily changed, on a frame by frame basis if desired. The synchronization function allows these changes to be easily implemented during the not-expose period of the camera so as not to negatively affect the image being acquired. The wavelength values can be programmed randomly from a computer, or they can be input once and repeated at an interval determined by an internal counter, thereby allowing a steady sequence of wavelengths to be continually repeated over the interval.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A system for providing synchronization and control between the wavelength of a random wavelength access monochromatic illuminator and the image frames acquired by a video camera, comprising: a processing device coupled to said video camera; and a synchronizer/controller coupled to said processing device, said video camera, and said random wavelength access monochromatic illuminator; whereby: said processing device configures said synchronizer/controller with specific desired illumination wavelength values to be output by said random wavelength access monochromatic illuminator; and said synchronizer/controller controls said random wavelength access monochromatic illuminator using said wavelength values and synchronizes the switching of the wavelength of said random wavelength access monochromatic illuminator to correspond to a non-exposing period of said video camera.

* * * * *